(12) United States Patent
Che (10) Patent No.: US 8,193,656 B2
(45) Date of Patent: Jun. 5, 2012

(54) WATER AND WIND CURRENT POWER GENERATION SYSTEM

(76) Inventor: Hue N. Che, Long Beach, CA (US)

( * ) Notice: Subject to any disclaimer, the term of this patent is extended or adjusted under 35 U.S.C. 154(b) by 468 days.

(21) Appl. No.: 12/460,613

(22) Filed: Jul. 22, 2009

(65) Prior Publication Data

US 2011/0018279 A1 Jan. 27, 2011

(51) Int. Cl.
*F03B 13/00* (2006.01)
*F03D 9/00* (2006.01)
(52) U.S. Cl. .......................................... 290/54; 290/43
(58) Field of Classification Search .................. 290/42, 290/43, 44, 53, 54, 55
See application file for complete search history.

(56) References Cited

U.S. PATENT DOCUMENTS

| | | | | |
|---|---|---|---|---|
| 1,074,292 A * | 9/1913 | Reynolds | ........................ | 416/86 |
| 4,165,468 A * | 8/1979 | Fry et al. | ........................ | 290/55 |
| 4,850,190 A * | 7/1989 | Pitts | ................................ | 60/398 |
| 4,864,152 A * | 9/1989 | Pedersen | ........................ | 290/53 |
| 5,222,924 A | 6/1993 | Shin et al. | | |
| 6,616,402 B2 | 9/2003 | Selsam | | |
| 6,781,254 B2 * | 8/2004 | Roberts | ........................ | 290/55 |
| 7,008,172 B2 | 3/2006 | Selsam | | |
| 7,063,501 B2 | 6/2006 | Selsam | | |
| 7,105,942 B2 * | 9/2006 | Henriksen | ....................... | 290/55 |
| 7,851,936 B2 * | 12/2010 | Bolin | .............................. | 290/54 |
| 7,922,452 B2 * | 4/2011 | Dulcetti Filho | ............... | 416/117 |
| 2006/0233635 A1 | 10/2006 | Selsam | | |
| 2008/0093859 A1 | 4/2008 | Catlin | | |

* cited by examiner

*Primary Examiner* — Nicholas Ponomarenko (57) ABSTRACT

An apparatus using differential gearboxes to collect, combine, and transmit torque generated by multiple, interconnected rotor systems. The rotor systems are connected via a driveshaft. The driveshaft is connected to a generator gearbox, and the generator box drives an electrical generator. The torque may be converted to mechanical power by replacing the electrical generator with a mechanical power device. The rotors are activated by fluid currents such as wind or water.

7 Claims, 7 Drawing Sheets

WATER AND WIND CURRENT POWER GENERATION SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention generally relates to the process of obtaining energy from renewable sources. More specifically, the present invention provides a means of converting the kinetic energy of flowing fluids such as wind and/or water currents into mechanical power or electricity.

BACKGROUND OF THE INVENTION

The invention relates to the generation of electricity or mechanical power from renewable sources such as wind and/or water currents. Presently, wind mills and tidal current power generators consist of a single turbine that rotates around either a horizontal or vertical axis. The rotating turbine sets in motion a drive train that is connected to an electrical generator. The generator converts the wind and/or water current into electrical power, and the electrical power is transmitted to the electrical grid and distributed.

Horizontal axis turbines dominate the field of wind harvesting; however, to maximize the amount of energy generated and make said turbines cost-effective, these turbines require a large diameter. Due to their size, however, horizontal axis turbines have significant drawbacks, including: 1) the need for a strong structure to support the turbine; 2) difficulty transferring the turbine and support structure to the installation site; 3) a large drive train is required to transfer power from the rotor to the generator; 4) an assistive device such as an electric yaw is needed to keep the rotor pointed head-on into the wind; 5) the rotor blades are exposed to gale-force winds, wind shears, high-speed winds, turbulence, and irregular wind flow and need special mechanisms to protect them from more extreme conditions; and 6) the individual components of the turbine and support structure are expensive to fabricate, test, and change out when needed. These drawbacks combine to result in windmills and wind farms that are expensive to develop and maintain.

To partially eliminate the drawbacks of the horizontal axis turbine, vertical axis turbines with short, light-weight towers have been designed. However, these towers become unstable above a certain height and require additional support at the top of the rotors to maintain stability and proper rotation. This instability at higher altitudes results in the rotors being placed nearer to the ground. The closeness of the rotors and generators to the ground makes repairs easier and cheaper, but the turbine has difficulty self-starting and generates less electricity because wind speeds are slower near the ground.

To solve the issues associated with horizontal and vertical axis turbines, Selsam developed a serpentine wind turbine consisting of multiple small rotors installed on a flexible turbine driveshaft (U.S. Pat. No. 6,616,402 B2). However, the invention's adjacent aft rotors are positioned partially in the wind shade of the fore rotors, an alignment that greatly reduces system's efficiency. To overcome this problem, Selsam then designed a multi-rotor wind turbine that uses a generator as a counterweight (U.S. Pat. No. 7,063,501) and a side-furling co-axial multi-rotor wind turbine (U.S. Pat. No. 7,063,501). Both inventions lower the amount of wind shading that occurs, but neither eliminates it. Additionally, the rotors of the inventions are on an identical plane, which limits the amount of wind that can be converted into energy. Finally, the inventions are specifically designed to be used in wind currents and no means are provided to make said inventions effective in other fluid environments.

SUMMARY OF THE INVENTION

Accordingly, the present invention provides a device capable of generating electricity or mechanical power from the kinetic energy of renewable sources such as wind and water currents. The current from the wind or water flows through a series of small rotors, causing the rotors to rotate. The torque generated by the rotating rotors is transferred to attached differential gearboxes. The differential gearboxes combine the torque generated by the rotors together and transfer said torque to the driveshaft, causing the driveshaft to rotate. A generator or mechanical device is attached to the rotating driveshaft and electricity or mechanical power is generated.

DRAWING REFERENCE NUMERALS 1 rotor
2 rotor bearing
3 differential gearbox
3a differential gearbox input/output shaft
3b differential gearbox input/output shaft
3c differential gearbox input/output shaft
4 right-angle gearbox
4a right-angle gearbox input shaft
4b right-angle gearbox output shaft
5 support clasp
6 gearbox holder
7 mounting bracket
8 mounting bracket bolt
9 universal joint
10 coupling 11 driveshaft
12 rudder support
13 rotor support bearing
14 rotor system tower tube
15 t-shaped tower tube
16 stabilizing beam
17 counterweight
18 steady shaft
19 support shaft
20 securing coupling
21 rudder fastening bolt
22 chain mounting ring
23 fixed bolt
24 anchor
25 support chain
26 support ring
27 tower tube
28 short tower tube
29 medium-length tower tube
30 long tower tube
31 tube bolt
32 short driveshaft
33 tower top bearing
34 end plate
35 rudder
36 foundation
37 support tower base
38 tower bolt
39 wheel
40 floating power station
41 power station
42 generator gearbox
43 generator
44 power station bearing
45 tower tube base
46 tower tube base bolt
47 support tower
48 short support tower
49 long support tower
50 tower bearing
51 long driveshaft
52 driveshaft bearing
53 rotor system A
54 rotor system B
55 rotor system C
56 rotor system D
57 rotor system E
58 rotor system F
59 rotor system G
60 rotor system H
61 rotor system I
62 rotor system J
63 rotor system K
64 rotor system L
65 rotor system M Detailed Description—Preferred Embodiment The preferred embodiment (FIG. 1) of a power generating system is comprised of a series of interconnected rotor systems, each rotor system comprising of a rotor 1, a differential gearbox 3, and a rotatable driveshaft 11. One end of the axial shaft of rotor 1 is attached to a rotor support bearing 13. The rotor support bearing 13 is attached to a rudder 35 that is affixed to the underside of a floating power station 40 by means of a fixed bolt 23. The opposite end of the axial shaft of rotor 1 is connected to differential gearbox 3 at a differential gearbox input/output shaft 3a. The differential gearbox 3 is connected to a support clasp 5 that is clipped onto a support ring 26 that has been integrated into a support chain 25. The support chain 25 extends from a mounting ring 22 affixed to the underside of floating power station 40 to an anchor 24.

Figure 1:
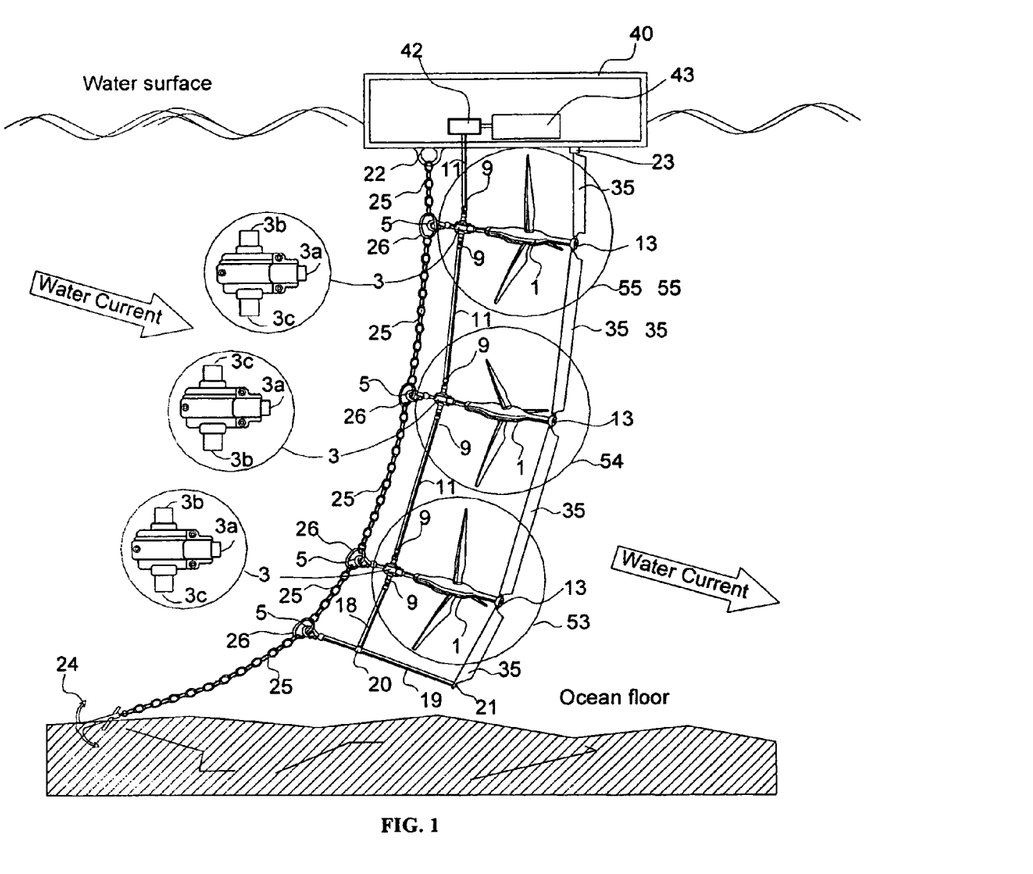
FIG. 1 is a side view of the preferred embodiment of the power generation system.

The differential gearboxes 3 of rotor systems A, B, and C 53, 54, and 55 are interconnected by means of multiple driveshafts 11. Universal joints 9 connect driveshafts 11 to differential gearboxes 3 at a differential gearbox input/output shaft 3b or 3c. To provide additional structural support, a support shaft 19 is affixed to the base of rudder 35 by means of a rudder fastening bolt 21. The support shaft 19 is connected to the appropriate support ring 26 by means of support clasp 5. A steady shaft 18 is connected to support shaft 19 by means of a securing coupling 20.

The system generates power as follows: water current causes rotor 1 of rotor system A 53 to rotate, generating torque. Said torque is transferred to differential gearbox 3 of rotor system A 53 via the differential gearbox input/output shaft 3a. The universal joint 9 connects the driveshaft 11 to differential gearbox 3 at differential gearbox input/output shaft 3c. The differential gearbox 3 transfers the torque to driveshaft 11, causing driveshaft 11 to rotate. The steady shaft 18 connected to differential gearbox 3 at differential gearbox input/output shaft 3b by means of universal joint 9 ensures that said torque is sent to driveshaft 11.

The rotating driveshaft 11 connects differential gearbox 3 of rotor system A 53 to differential gearbox 3 of rotor system B 54. To maximize energy production, the differential gearbox input/output shafts 3b and 3c of rotor systems A and B 53 and 54 are aligned. To accomplish this, differential gearbox 3 of rotor system B 54 is rotated 180 degrees on its horizontal axis in relation to differential gearbox 3 of rotor system A 53. Universal joints 9 attach to both ends of driveshaft 11, connecting said driveshaft 11 to differential gearbox input/output shafts 3c of rotor systems A and B 53 and 54. The axial shaft of rotor 1 of rotor system B 54 is attached to differential gearbox 3 in a manner identical to that of rotor system A 53.

The torque generated by rotor 1 of rotor system B 54 is transferred to differential gearbox 3 of rotor system B 54 via differential gearbox input/output shaft 3a. The differential gearbox 3 combines the torque generated by rotor system B 54 with the torque generated by rotor system A 53. The combined torque of rotor systems A and B 53 and 54 are transferred to driveshaft 11 connected to differential gearbox 3 at differential gearbox input/output shaft 3b by means of universal joint 9, causing said driveshaft 11 to rotate.

The rotating driveshaft 11 connects differential gearbox 3 of rotor system B 54 to differential gearbox 3 of rotor system C 55. To maximize energy production, differential gearbox input/output shafts 3b and 3c of rotor systems B and C 54 and 55 are aligned. To accomplish this, differential gearbox 3 of rotor system C 55 is rotated 180 degrees on its horizontal axis in relation to differential gearbox 3 of rotor system B 54. Universal joints 9 attach to both ends of driveshaft 11, connecting said driveshaft 11 to differential gearbox input/output shafts 3b of rotor systems B and C 54 and 55. The axial shaft of rotor 1 of rotor system C 55 is attached to differential gearbox 3 in a manner identical to that of rotor systems A and B 53 and 54.

The torque generated by rotor 1 of rotor system C 55 is transferred to differential gearbox 3 of rotor system C 55 via differential gearbox input/output shaft 3a. The differential gearbox 3 combines the torque generated by rotor system C 55 with the torque generated by rotor systems A and B 53 and 54. The combined torque of rotor systems A, B, and C 53, 54, and 55 are transferred to driveshaft 11 connected to differential gearbox 3 at differential gearbox input/output shaft 3c by means of universal joint 9, causing said driveshaft 11 to rotate.

The combined torque of rotor systems A, B, and C 53, 54, and 55 is expressed as the rotation speed of driveshaft 11. As driveshaft 11 rotates, it turns a generator gearbox 42. The generator gearbox 42 drives a generator 43, and electricity is produced. Accordingly, the faster driveshaft 11 rotates, the greater the amount of electricity produced by the generator 43. To protect generator gearbox 42 and generator 43 from water and inclement weather, said generator gearbox 42 and said generator 43 are located inside floating power station 40.

To maintain maximum output in shifting currents, the power generating system is capable of rotating 360 degrees. As the current changes direction and pushes on rudder 35, the power generating system rotates around the support chain 25, enabling rotors 1 to remain in proper position in relation to the flow of the current.

Detailed Description—Second Embodiment

Like the preferred embodiment, the second embodiment (FIG. 2) of the power generating system is comprised of a series of interconnected rotor systems. The driveshaft 11 turns generator gearbox 42 that drives generator 43, and the torque generated by rotor systems D, E, and F 56, 57, and 58 is converted into electrical energy. However, while the power generating system operates in a manner similar to that of the preferred embodiment, the design of the second embodiment differs from the design the preferred embodiment.

Figure 2:
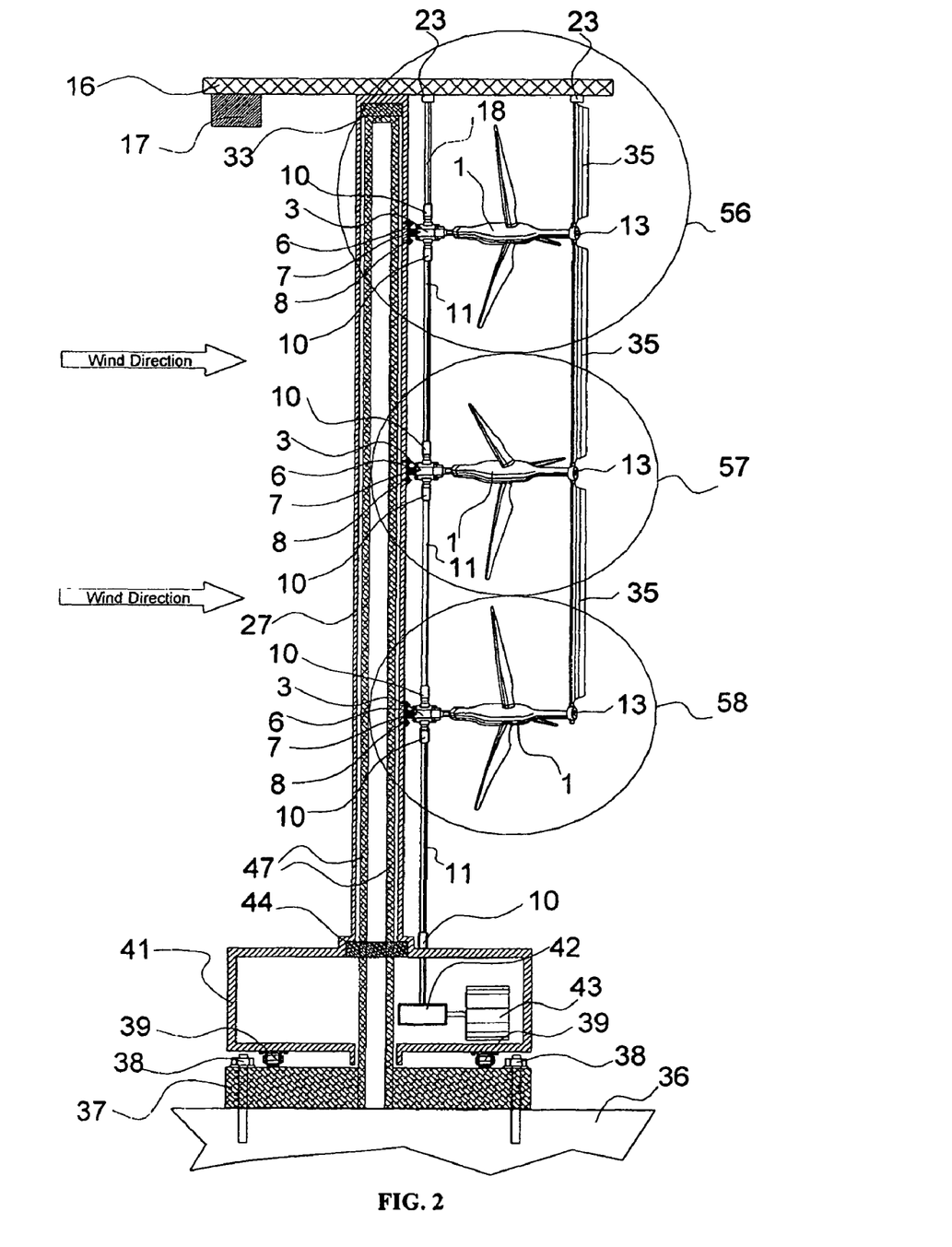
FIG. 2 is a side view of the second embodiment of the power generation system.

Each rotor system D, E, and F 56, 57, and 58 is comprised of rotor 1, differential gearbox 3, and driveshaft 11. One end of the axial shaft of rotor 1 is attached to rotor support bearing 13. The rotor support bearing 13 is attached to rudder 35 that is affixed to the underside of a stabilizing beam 16 by means of a fixed bolt 23. The opposite end of the axial shaft of rotor 1 is connected to differential gearbox 3 at differential gearbox input/output shaft 3a. The differential gearbox 3 is attached to gearbox holder 6. The gearbox holder 6 is fastened to a tower tube 27 by means of a mounting bracket 7. The mounting bracket 7 is secured to tower tube 27 by mounting bracket bolts 8.

Similar to the preferred embodiment, differential gearboxes 3 of rotor systems D, E, and F 56, 57, and 58 are interconnected by means of multiple rotatable driveshafts 11 connected to differential gearbox input/output shafts 3b or 3c; however, a coupling 10 has replaced universal joint 9 as the means to connect driveshaft 11 to differential gearbox input/output shafts 3b or 3c. The driveshaft 11 connects to generator gearbox 42. The generator gearbox 42 drives generator 43, and electricity is produced. The generator gearbox 42 and generator 43 are placed inside a power station 41. To ensure that driveshaft 11 receives the torque generated by rotor system D 56, fixed bolt 23 affixes steady shaft 18 to the underside of stabilizing beam 16. The steady shaft 18 is connected to differential gearbox 3 of rotor system D 56 at differential gearbox input/output shaft 3b.

To maintain maximum output in shifting winds, the power generating system is capable of rotating 360 degrees. Multiple wheels 39 are affixed to the underside of power station 41 and set atop a support tower base 37. The support tower base 37 is secured to a foundation 36 by tower bolts 38. The tower tube 27 bisects the top of power station 41 and extends from the top of said power station 41 to the underside of stability beam 16. A support tower 47 located inside tower tube 27 and extending from foundation 36 to the underside of the inside top of tower tube 27 bisects support tower base 37 and power station 41. A power station bearing 44 located at the base of tower tube 27 and a tower top bearing 33 located at the top of support tower 47 enable tower tube 27 to rotate 360 degrees around support tower 47. To maintain an even weight distribution, a counterweight 17 is secured to the underside of stabilizing beam 16 at the end opposite rudder 35. As the wind changes direction and pushes on rudder 35, the power generating system rotates around support tower 47, enabling rotors 1 to remain in proper position in relation to the flow of the current.

Detailed Description—Third Embodiment

Similar to the second embodiment, the third embodiment (FIG. 3 and FIG. 4) of the power generating system is comprised of a series of interconnected rotor systems. The driveshaft 11 turns generator gearbox 42 that drives generator 43, and the torque generated by rotor systems G, H, and I 59, 60, and 61 is converted into electrical energy. In this embodiment, however, the couplings 10, differential gearboxes 3, and differential gearbox input/output shafts 3a, 3b, and 3c are contained inside multiple hollow rotor system tower tubes 14, and driveshaft 11 is contained inside multiple hollow medium-length tower tubes 29. Additionally, stabilizing beam 16 of the second embodiment has been replaced by an end plate 34.

Figure 3:
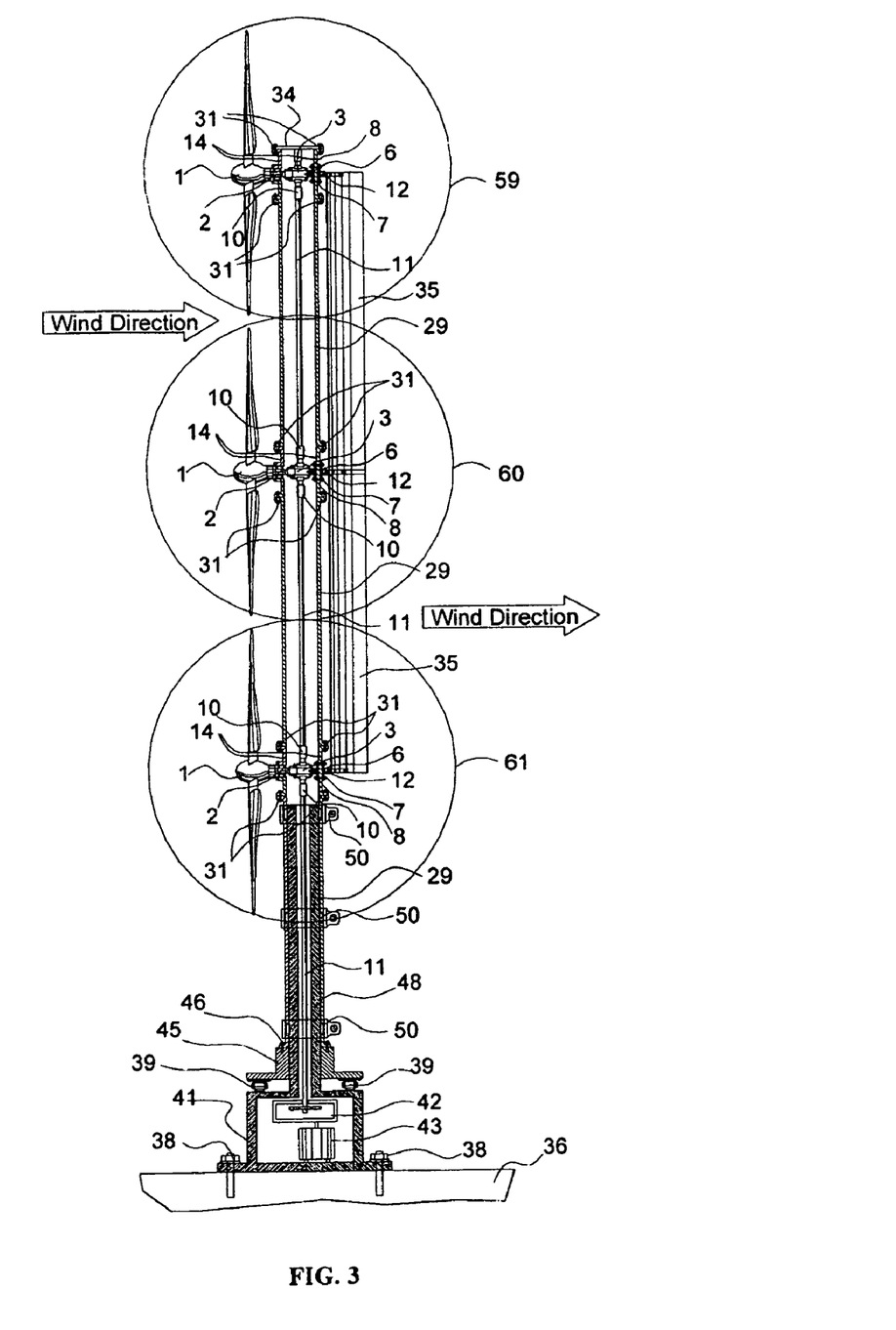
FIG. 3 is a side view of the third embodiment of the power generation system.
Figure 4:
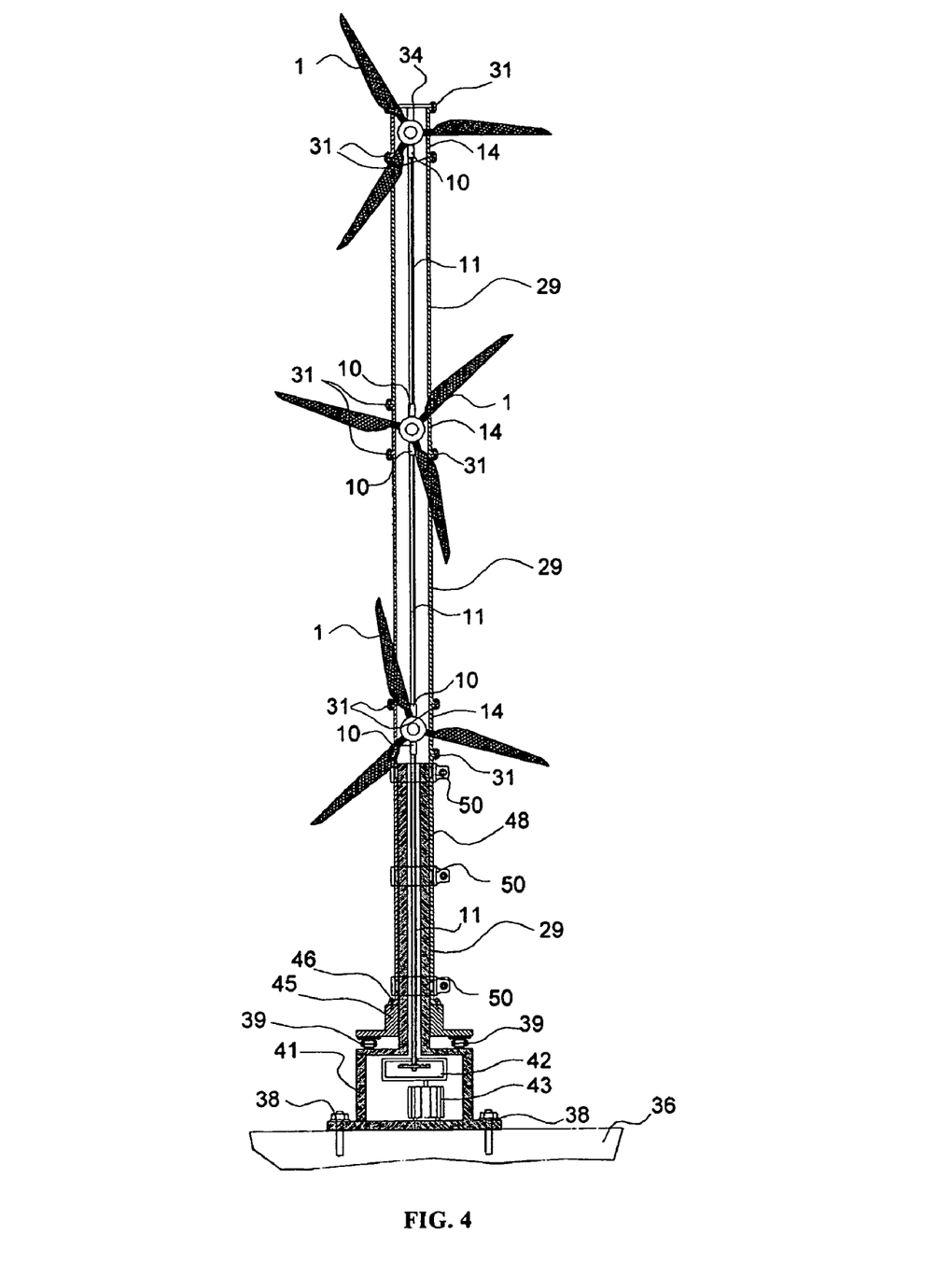
FIG. 4 is a front view of the third embodiment of the power generation system.

The hollow support structure of the power generating system is assembled as follows: the end plate 34 is connected to the top of rotor system tower tube 14 of rotor system G 59. The base of said rotor system tower tube 14 is connected to the top of medium-length tower tube 29. The base of said medium-length tower tube 29 is connected to the top of rotor system tower tube 14 of rotor system H 60. The base of said rotor system tower tube 14 is connected to another medium-length tower tube 29. The base of said medium-length tower tube 29 is connected to the top of rotor system tower tube 14 of rotor system I 61. A final medium-length tube tower 29 extends from the base of said rotor system tower tube 14 to a tower tube base 45 and is secured to the tower tube base 45 by means of tower tube base bolts 46. The rotor system tower tubes 14 are secured to the medium-length tower tubes 29 by means of tower bolts 31. Said tower bolts 31 also secure end plate 34 to rotor system tower tube 14 of rotor system G 59.

Figure 4A:
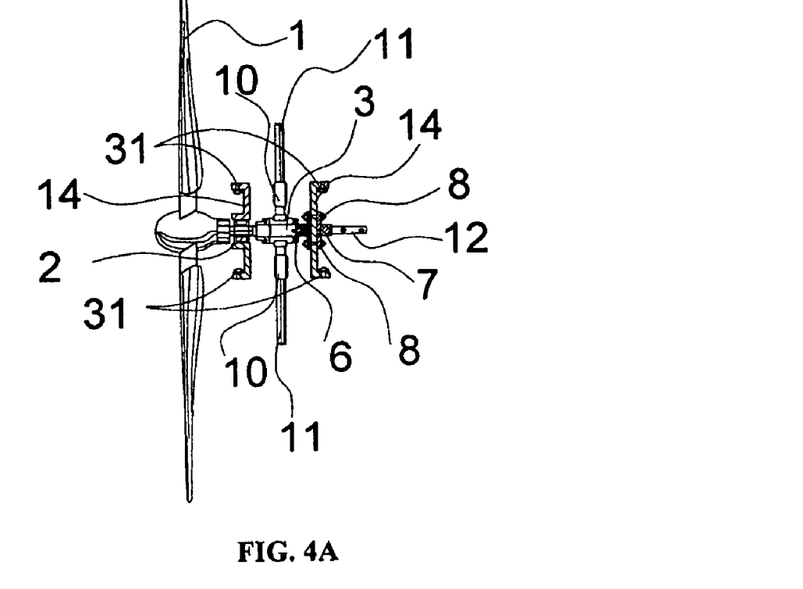
FIG. 4A is a side view of the rotor system of the third embodiment.

As illustrated in FIG. 4A, rotor 1 of each rotor system G, H, and I 59, 60, and 61 is attached to a rotor bearing 2. The rotor bearing 2 is fitted into a circular opening located on the face of rotor system tower tube 14. The axial shaft of rotor 1 is connected to differential gearbox 3 at differential gearbox input/output shaft 3a. On the face of rotor system tower tube 14 opposite rotor 1, a rudder support 12 is fastened to mounting bracket 7. The rudder 35 is attached to rudder support 12. An additional mounting bracket 7 is affixed to the inside wall of rotor system tower tube 14 parallel to the outside mounting bracket 7. The outside mounting bracket 7 and inside mounting bracket 7 are secured together by means of mounting bracket bolts 8. The gearbox holder 6 is attached to inside mounting bracket 7, and differential gearbox 3 is attached to said gearbox holder 6. The differential gearboxes 3 of rotor systems G, H, and I 59, 60, and 61 are interconnected by means of driveshaft 11. Said driveshaft 11 sends the combined torque generated by rotor systems G, H, and I 59, 60, and 61 to generator gearbox 42. The generator gearbox 42 drives generator 43, and electricity is produced.

Figure 4B:
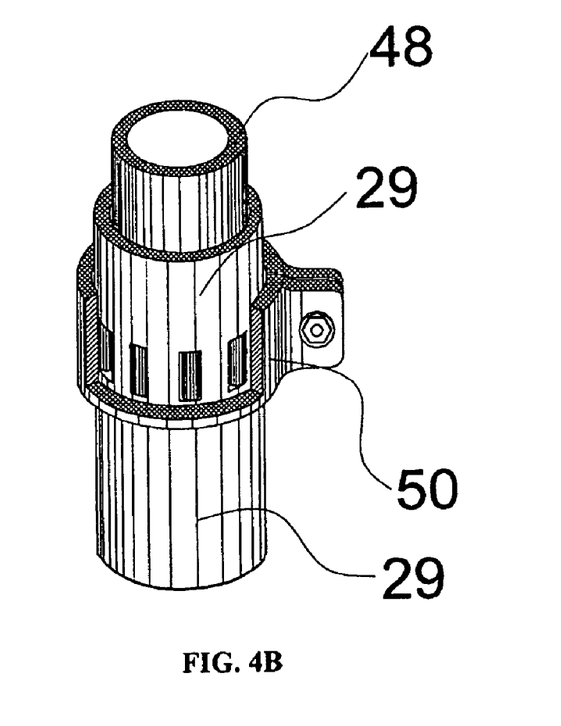
FIG. 4B is a front view of the tower bearing of the third embodiment.

To maintain maximum output in shifting winds, the power generating system is capable of rotating 360 degrees. Multiple wheels 39 are affixed to the underside of tower tube base 45 and set atop power station 41. Said power station 41 contains generator gearbox 42 and generator 43, and is secured to foundation 36 by means of tower bolts 38. A short support tower 48 located inside the final hollow medium-length tower tube 29 bisects the top of power station 41 and extends from the top of said power station 41 to the base of rotor system tower tube 14 of rotor system I 61. As illustrated in FIG. 4B, multiple tower bearings 50 enable the final medium-length tower tube 29 to rotate 360 degrees around the outside of short support tower 48. As the wind changes direction and pushes on rudder 35, the power generating system rotates around short support tower 48, enabling rotors 1 to remain in proper position in relation to the flow of the current.

Detailed Description—Fourth Embodiment

Figure 5:
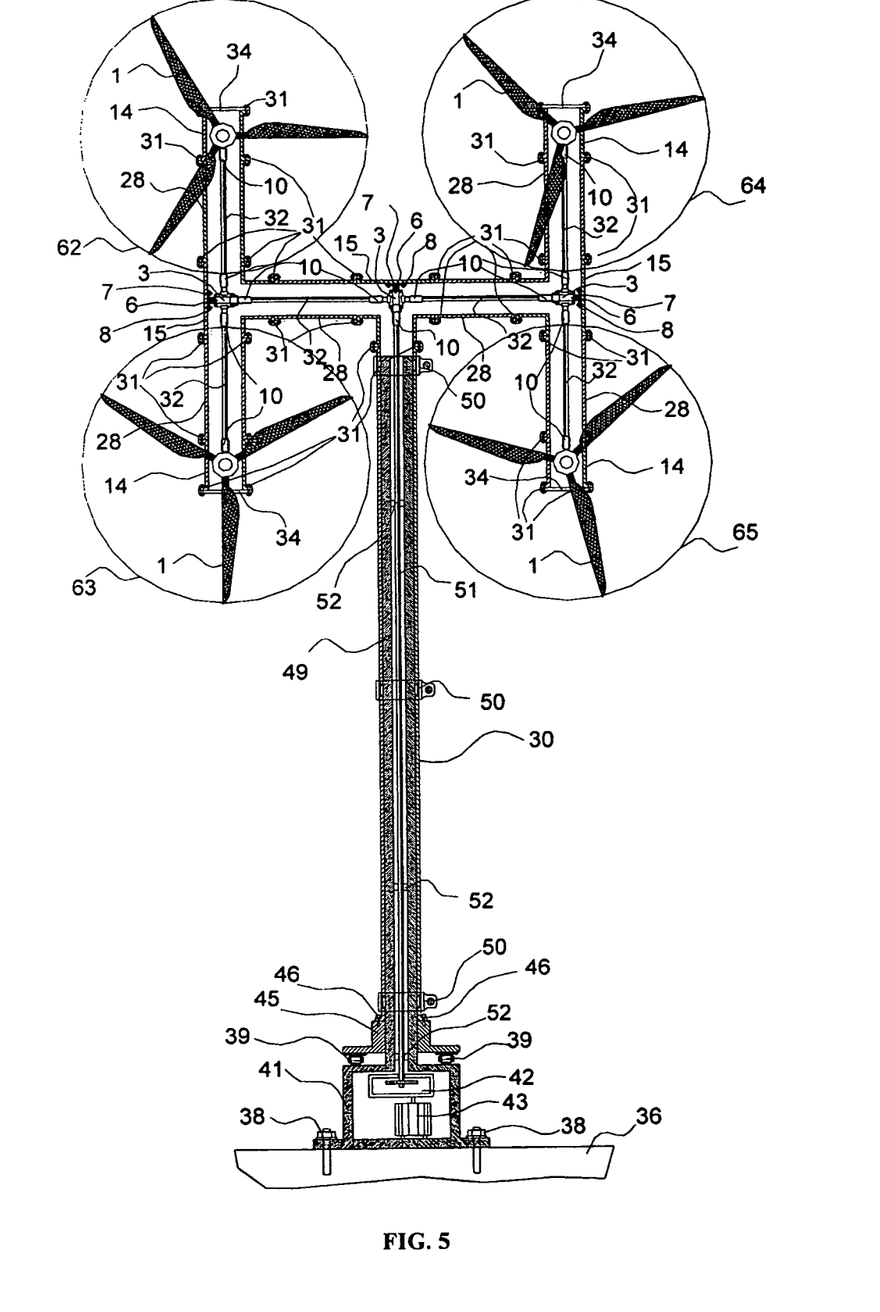
FIG. 5 is a front view of the fourth embodiment of the power generation system.

The fourth embodiment operates similarly to the previous embodiments and—like the third embodiment—the drive train is contained within hollow tower tubes of varying sizes and shapes. However, the design of the drive train differs from the drive train of prior embodiments.

As illustrated in FIG. 5, the rotor systems of the fourth embodiment are installed in pairs on both the left and right sides of a long tower tube 30. The vertical shaft of a t-shaped tower tube 15 is connected to said long tower tube 30. Short tower tubes 28 are connected to both the left and right sides of the horizontal shaft of said t-shaped tower tube 15. T-shaped tower tubes 15 that have been rotated 90 degrees on their horizontal axis are connected to the open end of said short tower tubes 28 at the now horizontal shaft of said t-shaped tower tubes 15. Short tower tubes 28 are connected to both the upper and lower ends of the now vertical shaft of both rotated t-shaped tower tubes 15. Each said short tower tube 28 is connected to rotor system tower tube 14. The end plate 34 is connected to each rotor system tower tube 14. The various tower tubes 14, 15, 28, and 30 and end plates 34 are secured together by means of multiple tube bolts 31.

Figure 5A:
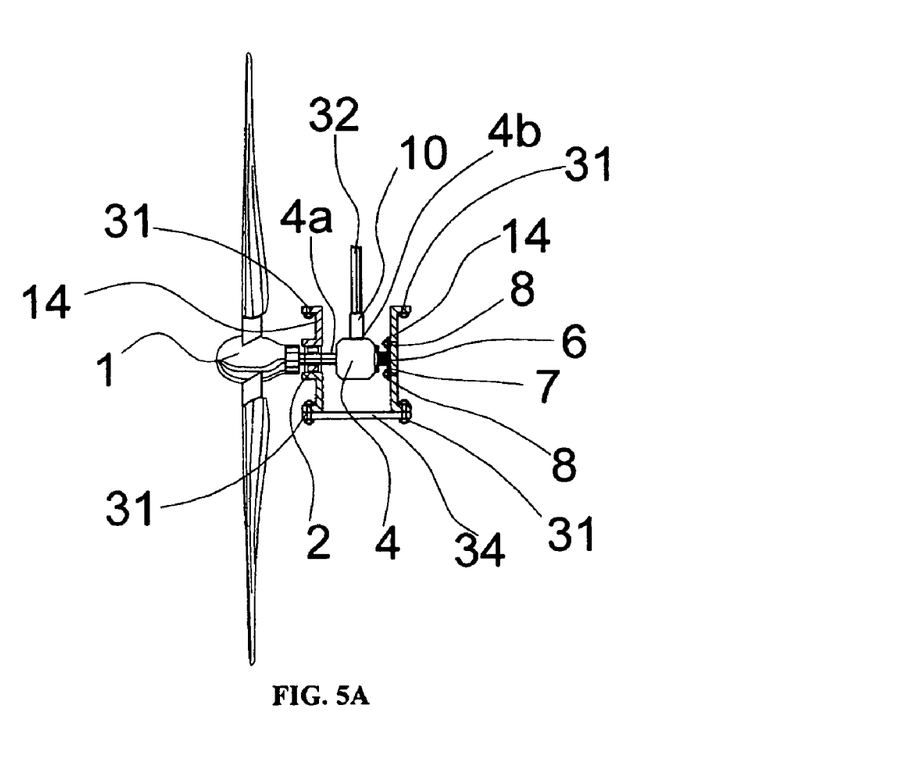
FIG. 5A is a side view of the rotor system of the fourth embodiment.

The rotor 1 of rotor system J 62 is attached to rotor bearing 2. The rotor bearing 2 is fitted into a circular opening located on the face of rotor system tower tube 14. The axial shaft of rotor I is connected to a right-angle gearbox 4 at a right-angle gearbox input shaft 4a. The right-angle gearbox 4 is secured in place by means of gearbox holder 6. Said gearbox holder 6 is fastened to mounting bracket 7, and said mounting bracket 7 is affixed to the inside wall of rotor system tower tube 14 by means of mounting bracket bolts 8. A rotatable short driveshaft 32 is connected to right-angle gearbox 4 at right-angle gearbox output shaft 4b by means of coupling 10. The rotating axial shaft of rotor 1 generates torque, and the torque is transferred to right-angle gearbox 4. Rotor systems K, L, and M 63, 64, and 65 operate in an identical manner.

Figure 5B:
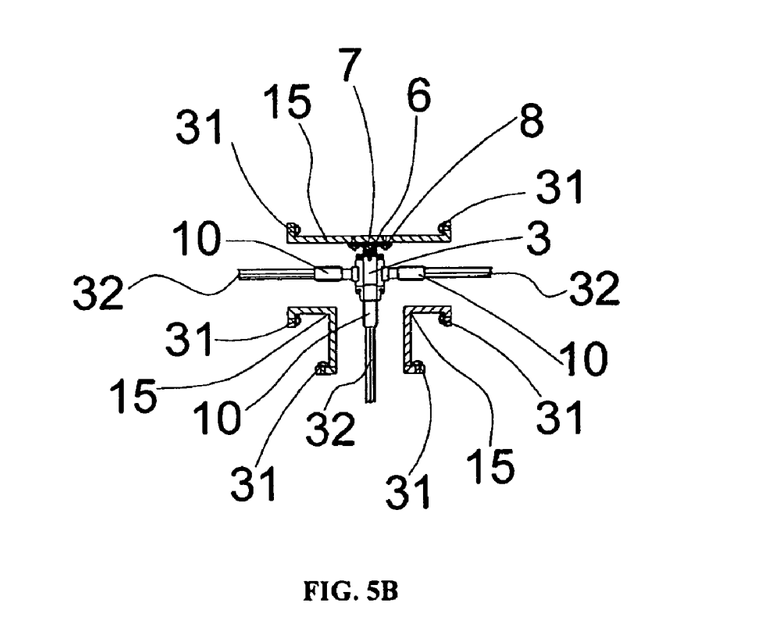
FIG. 5B is a side view of the differential gear mount of the fourth embodiment.

The short driveshaft 11 transfers the torque generated by rotor 1 of rotor systems J and K 62 and 63 from their respective right-angle gearboxes 4 to differential gearbox 3. The short driveshaft 32 is connected to differential gearbox 3 at differential gearbox input/output shaft 3b or 3c by means of coupling 10. The differential gearbox 3 is attached to gearbox holder 6. The gearbox holder 6 is fastened to mounting bracket 7. The mounting bracket 7 is affixed to the vertical inside wall of the t-shaped tower tube 15 by means of mounting bracket bolts 8. On the opposite side of the power generating system, the torque generated by rotor systems L and M 64 and 65 are combined together in an identical manner.

The torque generated by rotor systems J and K 62 and 63 is combined with the torque generated by rotor systems L and M 64 and 65 at differential gearbox 3 located above long tower tube 30. The short driveshaft 32 is connected to the differential gearbox 3 that combines the torque of rotor systems J and K 62 and 63 at differential gearbox input/output shaft 3a by means of coupling 10. The opposite end of short driveshaft 32 is connected to the differential gearbox 3 located above long tower tube 30 at differential gearbox input/output shaft 3b or 3c by means of coupling 10. The gearbox holder 6 is fastened to mounting bracket 7 and secures said differential gearbox 3 in place. The mounting bracket 7 is affixed to the upper inside wall of the t-shaped tower tube 15 by means of mounting bracket bolts 8. The differential gearbox 3 that combines the torque of rotor systems L and M 64 and 65 connects to the differential gearbox 3 located above long tower tube 30 in an identical manner.

The torque of the four rotor systems J, K, L, and M 62, 63, 64, and 65 is combined at the differential gearbox 3 located above long tower tube 30 and transferred to a rotatable long driveshaft 51. Said long driveshaft 51 is connected to the differential gearbox 3 located above long tower tube 30 at differential gearbox input/output shaft 3a. The long driveshaft 51 connects to generator gearbox 42. The generator gearbox 42 drives generator 43, and electricity is produced. To control the vibrations of long driveshaft 51, multiple driveshaft bearings 52 are placed periodically between long driveshaft 51 and a long support tower 49.

To maintain maximum output in shifting winds, the power generating system is capable of rotating 360 degrees. Multiple wheels 39 are affixed to the underside of tower tube base 45 and set atop power station 41. Said power station 41 contains generator gearbox 42 and generator 43. The power station 41 is secured to foundation 36 by means of tower bolts 38. The long support tower 49 located inside long tower tube 30 bisects the top of the power station 41 and extends from the top of said power station 41 to the base of the t-shaped tower tube 15 attached to long tower tube 30. As illustrated in FIG. 4B, multiple tower bearings 50 enable long tower tube 30 to rotate 360 degrees around the outside of long support tower 49. As the wind changes direction, the power generating system rotates around the long support tower 49, enabling the rotors 1 to remain in proper position in relation to the flow of the current. The rotation of the power generating system can be controlled by a variety of means.

Conclusion, Ramifications, and Scope

Accordingly the reader will see that, according to multiple embodiments of the invention, I have provided a means of converting the kinetic energy of flowing fluids such as wind and/or water currents into electricity.

While the above descriptions contain many specificities, these should not be construed as limitations on the scope of any embodiment, but as exemplifications of the presently preferred embodiments thereof. Many other ramifications and variations are possible within the teachings of the various embodiments. For example, the design of the support structure can be altered, the number of rotor systems can be adjusted, a variety of materials may be used in the construction of the various parts needed for the power generating system, and the system can be designed to produce mechanical power rather than electrical power.

Thus the scope of the invention should be determined by the appended claims and their legal equivalents, and not by the examples given.

I claim:

1. A water and/or wind current power generating system which uses the function of differential gearing to combine the energies generated from a plurality of individual rotor systems powered by wind or water currents to maximize the amount of clean energy produced by compact and efficient embodiments, comprising:

a. said plurality of rotor systems;
   i. said rotor systems having means for coaxial attachment to a plurality of differential gearboxes, whereby the torque generated by said rotor systems is transferred via said differential gearboxes to a plurality of driveshafts;
   ii. said differential gearboxes having means for attachment to a support structure, wherein said differential gearboxes have a plurality of input/output shafts with each said input/output shaft having means for attachment to said driveshafts via a coupling device;
   iii. a plurality of said driveshafts, each said driveshaft having means for attachment to said coupling device at both ends of said driveshafts; and
   iv. said plurality of rotor systems having means for attachment to one another via said driveshafts; whereby the torque of said rotor systems are combined using the function of said differential gearboxes, thereby causing the rotational speed and torque of said driveshafts to increase with each incremental said rotor system, thus ultimately producing a greater mechanical energy than can be harnessed in a system without differential gearing;
b. said support structure;
c. a rudder having means for attachment to said rotor systems or said support structure; and
d. a power station.

2. The plurality of said rotor systems of claim 1, wherein said rotor systems are interconnected in a series by means of said driveshafts, whereby said torque generated by each said rotor system is combined with said torque generated by each previous and subsequent said rotor system in said series at said differential gearbox.

3. The plurality of said rotor systems of claim 1, each said rotor system further including
   a. said rotor having means for coaxial attachment to a gearbox, whereby said torque generated by said rotor is transferred via said gearbox to said driveshaft;
   b. said gearbox having means for attachment to said support structure, wherein said gearbox has an appropriate number of input/output shafts with each said input/output shaft having means for attachment to said driveshaft via said coupling device; and
   c. said driveshaft having means for attachment to said coupling device at both ends of said driveshaft.

4. The plurality of rotor systems of claim 3, further including
   a. said plurality of said rotor systems interconnected by means of said driveshafts and said differential gearboxes, whereby said torque generated by each said rotor system is combined with the torque generated by each previous and subsequent said rotor system in said series at said differential gearbox;
   b. a plurality of said differential gearboxes, each said gearbox having means for attachment to said support structure, and wherein each said differential gearbox has an appropriate number of said input/output shafts with each input/output shaft having means for attachment to driveshaft via said coupling device.

5. The support structure of claim 1, further comprising
   a. a hollow, cylindrical outer tower having a predetermined length and diameter sufficient to fit a cylindrical support tower within the hollow core of said outer tower;
   b. said support tower having a predetermined length and diameter, wherein the outer surface of said support tower is positioned an appropriate distance from the inner surface of said outer tower; and
   c. a plurality of bearings providing means for said outer tower to rotate around said support tower, whereby said bearings are positioned at appropriate intervals.

6. The support structure of claim 5, further including:
   a. a plurality of hollow, cylindrical tower tubes having a predetermined diameter and of varying lengths, wherein said tower tubes have a circular flange on both the upper and lower ends of said tower tubes, said circular flanges having a plurality of threaded holes spaced apart at an appropriate distance, whereby allowing attachment to another said tower tube, a rotor tube, or a t-shaped tube by appropriate means;
   b. a plurality of said hollow, cylindrical rotor tubes having a predetermined diameter and length, wherein a circular slot of appropriate diameter with flanges of an appropriate length is cut into and through the wall of said rotor tube at one spot on said wall, and wherein said rotor tubes have said circular flange on both the upper and lower ends of said rotor tubes, said circular flanges having a plurality of threaded holes spaced apart at an appropriate distances whereby allowing attachment to another said rotor tube, said tower tube, said t-shaped tube, or an end plate by appropriate means;
   c. said end plate having a predetermined diameter, wherein the outer edge of said end plate has a plurality of threaded holes spaced apart at an appropriate distance whereby allowing attachment to said rotor tube by appropriate means,
   d. a base having an appropriate shape and diameter, said base having means for attachment to said tower tubes, and wherein said base having means for 360 degree rotation.

7. The support structure of claim 6 1, further comprising a plurality of said hollow, cylindrical t-shaped tubes, wherein all three ends of said t-shaped tube have a circular flange, and wherein said flange has a plurality of threaded holes allowing for interconnection with additional said t-shaped tubes, said rotor tubes, and said tower tubes.

\* \* \* \* \*